H. J. BENJAMIN.
TANK REGISTERING DEVICE.
APPLICATION FILED APR. 21, 1916.

1,300,327.

Patented Apr. 15, 1919.
2 SHEETS—SHEET 2.

Inventor
H. J. Benjamin
By his Attorney
Charles H. Wilson

UNITED STATES PATENT OFFICE.

HENRY J. BENJAMIN, OF NEW YORK, N. Y.

TANK-REGISTERING DEVICE.

1,300,327.        Specification of Letters Patent.        Patented Apr. 15, 1919.

Application filed April 21, 1916. Serial No. 92,628.

*To all whom it may concern:*

Be it known that I, HENRY J. BENJAMIN, residing at New York, in the county of New York and State of New York, have invented certain new and useful Improvements in Tank-Registering Devices, of which the following is a specification.

This invention relates to an indicating and registering device for tanks.

The particular object of this invention is to provide an indicating and registering device, adaptable for efficient use in connection with the fuel or oil tanks of automobiles or the like where the tanks are subject to vibration and movement.

A more detailed object is to provide an indicating and registering device which may be employed in connection with automobiles or the like, which will accurately register the amount of oil or fuel placed into the tank or taken therefrom at any time, and which will accurately register the total of all amounts of oil or fuel placed into the tank within a given period, and to provide means whereby the vibration and movement of the tank, due to the travel of the automobile, will not detrimentally affect the device or devices.

A further and more detailed object is to provide a device of the type indicated formed with an opening through which the oil or fuel may be introduced into the tank, and to provide means associated with said opening for controlling the operation of the indicating and registering devices.

Other objects and aims of the invention, more or less specific than those referred to above, will be in part obvious and in part pointed out in the course of the following description of the elements, combinations, arrangements, and applications of principles constituting the invention; and the scope of protection contemplated will be indicated in the appended claims.

In the accompanying drawings which are to be taken as a part of this specification, and in which I have shown a merely preferred form of embodiment of the invention:

Figure 1 is a vertical sectional view through a device constructed in accordance with the principles of this invention, parts being shown in elevation.

Fig. 4 is an enlarged fragmentary detail view taken upon the plane of line IV—IV of Fig. 2.

Fig. 5 is a detail view of one of the parts detached; and

Fig. 6 is a horizontal sectional view taken upon the plane of line VI—VI of Fig. 1.

Figure 2:
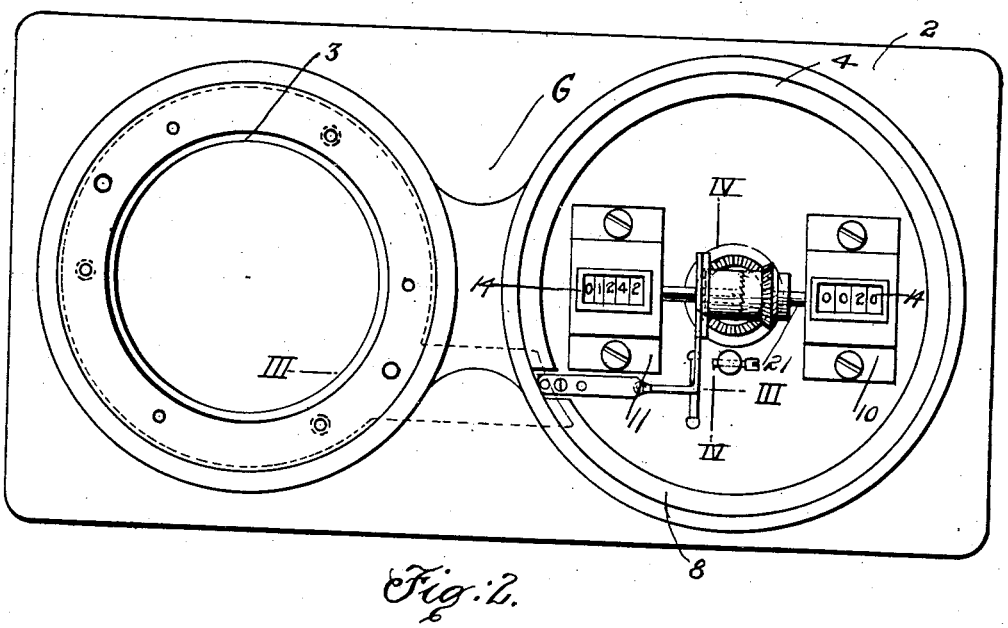
Fig. 2 is a top plan view of the structure shown in Fig. 1, the cover parts being removed to better disclose the invention.

Referring to the drawings for a detailed description of the structure which is illustrated therein, the reference character L indicates the tank. This may be of any desired type and is formed with an opening 1 within which the parts constituting this invention are arranged.

The reference character G indicates a main casing or body member which is arranged over the opening 1, and which is provided with a flange 2 adapted to be fixed or sealed tightly in position upon the material of the tank.

The body member G is formed with two openings therethrough; one of which, as 3, constitutes the means through which oil or fuel may be introduced into the tank. This opening is closed by a screw plug 4. A cylindrical casing H is supported within the second opening, said second opening being provided with a shoulder 5, and the casing being provided with an over-hanging portion 6 for engaging such shoulder. A second plug 7 closes the upper end of said second opening and, operating through a ring-like member 8, presses the over-hanging portion 6 of the casing tightly against the shoulder 5, so as to retain the casing rigidly fixed to the body member G at all times when the second plug 7 is in position.

The upper end of the casing H is closed by a wall 9, which wall constitutes a platform upon which the indicating and registering devices 10 and 11 respectively are supported.

The ring 8 serves to space the wall or platform 9 away from the inner surface of the plug 7 so as to provide a suitable space or compartment for receiving the indicating and registering devices 10 and 11 respectively. The plug 7 is formed with openings 12 and 13 through which the registering characters 14, of the indicating and registering devices 10 and 11, may be inspected from without.

Preferably a transparent plate, as 15, of glass or other suitable material is arranged beneath the openings 12 and 13 for excluding dust, etc., from the compartment occupied by the indicating device. This glass 15 may be held in any suitable manner, but is preferably supported upon a ring 16 screwed into position as clearly indicated in Figs. 1 and 3.

The wall or platform 9 is fitted with a bearing member 17 in which the upper end of a shaft 18 is rotatably mounted. Beyond the bearing member 17 said shaft is fitted with a bevel gear 19 arranged in constant mesh with a bevel gear 20 mounted upon the shaft of the indicating device 10.

The casing H projects downwardly into the tank as clearly indicated, and the shaft 18 extends longitudinally thereof, the lower end of the shaft being journaled as at 22 in the bottom wall of the casing.

A float 23 is arranged within the casing to move freely upwardly and downwardly in accordance with the changing level of the contents of the tank.

A finger 24 is carried by the float arranged to engage within a spiral groove 25, formed in the shaft, for rotating the shaft as the float moves. Suitable means, as the ribs 26, engaged by the rollers 27, may be provided for retaining the float against any rotary movement.

As thus far described it will be understood that when fuel is introduced into the tank through opening 3, so that the float 23 is caused to rise, the shaft 18 will be caused to rotate and will impart movement to the gears 19 and 20 which operate the indicating device 10. Every gallon of fuel introduced into the tank will be indicated on the indicating device 10, the characters 14 of said indicating device changing from 1 to 2; 2 to 3; 3 to 4, etc., as the gallons are introduced. When the fuel is withdrawn from the tank the shaft 18 will, of course, rotate in the opposite direction and the characters in the indicating device 10 will change from one to the other in reverse order, 8 to 7; 7 to 6; 6 to 5, etc.

The indicating device 10 will thus show at all times the quantity of fuel actually in the tank at the time of inspection.

The registering device 11 is intended to register the totals of all quantities of fuel placed within the tank in any given period. The most preferable time for the registering device 11 to be operated is at the time when fuel is being poured into the tank. At other times it is desirable that said registering device 11 be entirely disconnected.

In order that the registering device 11 may be operatively associated with the float 23 only when the plug 4 is removed from the opening 3, as it must be in order that fuel may be poured into the tank, this invention includes means extending from the opening 3, and controlled by the plug 4, to govern the operation of the registering device 11. This means preferably takes the form of a ring 28 (see Fig. 5) arranged within the opening 4, being spring-pressed upwardly as by the spring 29, and being adapted to be forced downwardly when the plug 4 is inserted. The ring is provided with a projecting arm 30 extending laterally therefrom into position adjacent to the upper end of the casing H to be engaged by the lower end of a plunger-rod 31 which is vertically slidably mounted within a bearing portion 32 formed upon the wall or platform 9 of the casing. The plunger-rod 31 is fixed at its upper end to a vertically movable member 33 mounted upon a guide pin 34 carried by the platform 9. A light spring 35 is arranged to urge the plunger-rod downwardly at all times into engagement with the end of the arm 30.

A member 33 projects laterally from the plunger-rod and has a depending projection 36 resting in engagement with the horizontal end of a bell crank lever 37. A light tension spring 38 preferably extends between the member 23 and the arm of the bell crank lever retaining such parts in close engagement at all times.

The bell crank lever 37, is pivotally mounted, as at 39, in a pair of standards 40, carried upon the platform 9. The opposite end of the bell crank lever projects substantially vertically upwardly and is formed with a lateral extension 41 which straddles a clutch member 42 mounted to slide forwardly and backwardly along the squared shaft 43 of the registering device 11. The shaft 43 is arranged in axial alinement with the shaft 21 of the indicating device 10. Suitable fingers 44 are provided upon the extension 41 for engaging within a groove 45 provided within the clutch member 42.

The clutch member 42 is free to rotate relatively to the extension 41 but is subject to slidable movement forwardly toward the gear 10 and backwardly toward the indicating device 11, along the shaft 43, according to the position of the bell crank lever, and the position of the bell crank lever is subject to the insertion or removal of the plug 4.

It will be understood that when the plug 4 is screwed upwardly or removed, then, the ring 28 will follow under the impulse of the springs 29, and will raise the plunger-rod 31, to swing the bell crank lever.

The clutch member 42 is provided with teeth 46 on its forward end surface adapted to engage with opposing teeth 47 formed upon the face of the gear 20, when the vertical arm of the bell crank lever is swung forwardly.

Figure 3:
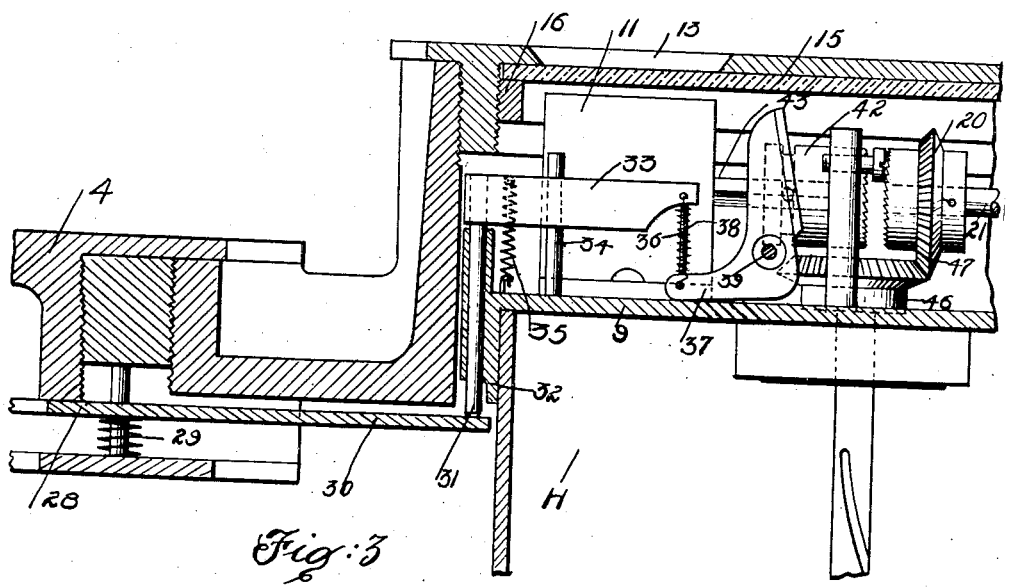
Fig. 3 is an enlarged detail vertical sectional view taken upon the plane of line III—III of Fig. 2.

When the plug 4 is inserted within the opening 3, so that it engages the ring 28 and forces the same downwardly, as shown in Fig. 3, the plunger-rod follows downwardly, under the impulse of spring 35 and, acting through the member 33—36, moves the bell crank lever to swing the vertical arm of said lever backwardly, so as to disengage the teeth 46—47. The registering device 11 is thus entirely disconnected, so long as the plug 4, is in position in the opening 3, and the indication or information conveyed by the characters 14 thereof will remain constant until the plug 4 is removed.

This feature of the invention is particularly valuable when the device is to be used in connection with automobiles or other tanks subject to vibration and movement, because of the fact that in such tanks the level of the liquid is constantly being agitated and changed by the roll and pitch of the vehicle. Such agitation, of course, causes the float to constantly change the position to a greater or less extent. This constant changing does not detrimentally affect the characters upon the indicating device 10, because said indicating device is directly and constantly connected with the shaft 18. It would, however, produce an inaccuracy in the record of the registering device 11, for necessarily the shaft 43, of the registering device 11, must rotate in one direction only. This rotation must be in exact accordance with the amount of fuel placed in the tank at any time and must not be altered or counteracted or reversed by such undesirable movements of the float as occur during the travel of an automobile.

The complete operation of the device may now be fully understood: When the plug 4 is removed, and fuel poured into the tank, the float will rise and rotate the shaft 18, causing the indicating device 10 to register the amount of fuel poured in. The act of removing the plug 4 will throw the clutch 42 into engagement with the gear 20, and the rotation of said gear, as the float rises, will be imparted to the registering device 11. The amount of fuel poured in will be recorded in the registering device 11, as added to the amount already recorded upon said registering device 11.

When the filling operation is completed and the plug 4, is returned, the clutch 42 is automatically disconnected from the gear 20. Any vibration or movement, and consequent variation of level of the contents, to which the tank may be subjected may cause the shaft 18, to rotate slightly first in one direction and then in the other and cause the characters upon the indicating device 10 to change slightly first upwardly and then downwardly, but when the movement or the agitation of the tank ceases the indicating device 10, will show the amount of liquid actually within the tank. As the contents of the tank are withdrawn the characters of the indicating device 10 will move backwardly and continue to show the amount remaining within the tank.

The characters upon the registering device 11 will not be affected in any manner by the agitation or movement of the contents of the tank, nor will they be affected by the withdrawal of any portion of said contents, so long as the plug 4 is in position within the opening 3.

The total, as recorded by the registering device 11, will thus be a true total.

The actual structural details by which the ring 28 is retained are comparatively unimportant. Preferably, however, a ring 48 is threaded into the opening 3, to provide a recess between its lower surface and the upper surface of a flange 49 within which recess the ring 28 is retained. Suitable guide pins 50 may extend between the ring 48 and the flange 49 for guiding the ring 28 and for supporting the spring 29. The inner annular surface of the ring 48 is threaded to receive the plug 4.

The function of the tension spring 38, extending between the member 23 and the horizontal arm of the bell crank lever, is particularly that of permitting a slight lost motion as between said member 33 and said arm, whereby to allow the member 33 to move upwardly a slight distance after the bell crank lever has swung to a point where the teeth 46—47 of the clutch are in engagement. The tension spring 38 is thus brought into play for resiliently urging the teeth 46—47 into close and positive engagement; while at the same time permitting the clutch member to move backwardly under the resilient pressure for a slight distance to permit the teeth 47 of the gear 20 to click past the teeth 46 of the clutch member 42 when, as may possibly occur at times, the gear 20 is rotated in a direction to reduce the total shown by the registering device 11. This acts as a sort of auxiliary or safety device to the connections between the clutch and the plug 4.

Having thus described my invention what I claim as new and desire to secure by Letters Patent is:

1. In a device of the class described, in combination, a container, said container having an inlet opening, a rotatable shaft, a float associated with said shaft to control the rotation thereof as liquid is inserted or withdrawn from said container, a pair of shafts mounted to rotate in axial alinement, a driving connection between said first mentioned shaft and one shaft of said pair of shafts, a registering device adapted to be operated by the other one of said pair of shafts, clutch mechanism adapted to operatively connect said pair of shafts, a closure member for said container and means operated by said closure member for operating said clutch mechanism.

2. In a device of the class described, in combination, a container, said container having an inlet opening, a rotatable shaft, a float associated with said shaft to control the rotation thereof as liquid is inserted or withdrawn from said container, a pair of shafts mounted to rotate in axial alinement, a driving connection between said first mentioned shaft and one shaft of said pair of shafts, a registering device adapted to be operated by the other one of said pair of shafts, clutch mechanism adapted to operatively connect said pair of shafts, a closure member for said container adapted when positioned to close the latter to operate said clutch mechanism to operatively disconnect the shafts comprising said pair, and means when said closure member is removed from said container for automatically connecting the shafts comprising said pair.

In testimony whereof I affix my signature in the presence of two witnesses.

HENRY J. BENJAMIN.

Witnesses:
HARRY B. EMBLER,
L. GESSFORD HANDY.